United States Patent [19]
Xu et al.

[11] Patent Number: 5,973,822
[45] Date of Patent: Oct. 26, 1999

[54] ACOUSTO-OPTIC TUNABLE FILTER AND METHOD OF CALCULATING ITS EQUIVALENCE INCIDENT ANGLE

[75] Inventors: Kexin Xu; Hiroshi Yamamoto, both of Kyoto, Japan; Bin Xue, Tianjin, China

[73] Assignee: Kyoto Daiichi Kagaku Co., Ltd., Kyoto, Japan

[21] Appl. No.: 08/998,042

[22] Filed: Dec. 23, 1997

[30] Foreign Application Priority Data

Dec. 25, 1996 [JP] Japan ................................. 8-345117

[51] Int. Cl.⁶ ........................................................ G02F 1/33
[52] U.S. Cl. ........................ 359/308; 359/285; 359/313; 359/314; 356/328
[58] Field of Search .................................. 359/285, 305, 359/308, 314, 313; 356/346, 351, 354, 326, 328, 319

[56] References Cited

U.S. PATENT DOCUMENTS

| | | | |
|---|---|---|---|
| 4,037,933 | 7/1977 | Yano et al. | 359/313 |
| 4,342,502 | 8/1982 | Chang | 359/285 |
| 4,602,342 | 7/1986 | Gottlieb et al. | 359/308 |
| 4,639,092 | 1/1987 | Gottlieb et al. | 359/308 |
| 4,653,869 | 3/1987 | Gottlieb et al. | 359/308 |
| 5,002,395 | 3/1991 | Shah | 359/305 |
| 5,120,961 | 6/1992 | Levin et al. | 359/285 |
| 5,131,742 | 7/1992 | Schaff | 356/73 |
| 5,576,880 | 11/1996 | Chang | 359/305 |

FOREIGN PATENT DOCUMENTS

| | | |
|---|---|---|
| 4-172420 | 6/1992 | Japan . |
| 4172420 | 6/1992 | Japan . |

*Primary Examiner*—Georgia Epps
*Assistant Examiner*—Margaret Burke
*Attorney, Agent, or Firm*—Birch, Stewart, Kolasch & Birch, LLP

[57] ABSTRACT

In a non-collinear type acousto-optic tunable filter, the incident angle of a source light beam $L_1$ radiated from a light source 6 onto an acoustic medium 1 is set at an equivalence incident angle for which the wavelength $\lambda_i$ of the diffracted ordinary ray $L_3$ and the wavelength $\lambda_i'$ of the diffracted extraordinary ray $L_4$ become approximately identical. Further, the diffracted ordinary ray $L_3$ and the diffracted extraordinary ray $L_4$ of the approximately identical wavelength are superposed, and the intensity of the superposed ray is detected. Consequently, spectrometry is performed based on the superposed diffracted ray having twice the intensity and a very sharp waveform, so that accurate spectroscopy can be made possible even if the intensity of the source light beam is low.

12 Claims, 7 Drawing Sheets

Difference of acoustic wavevector angles for ordinary and extraordinary rays [°]

Fig. 6

Difference of acoustic frequencies for ordinary and extraordinary rays [MHz]

Fig. 7

Difference of acoustic wavevector angles and difference of acoustic frequencies for ordinary and extraordinary rays

ACOUSTO-OPTIC TUNABLE FILTER AND METHOD OF CALCULATING ITS EQUIVALENCE INCIDENT ANGLE

BACKGROUND OF THE INVENTION

1. Field of the Invention

The present invention relates to an acousto-optic tunable filter that is used in various optical apparatus such as spectroscopes and spectrophotometers and more particularly relates to a method of calculating the equivalence incident angle.

2. Description of the Related Art

In general, spectroscopes, spectrophotometers and the like are used in spectroscopy that obtains a spectrum by measuring the intensity of a source light beam in different wavelength regions. Prism spectroscopes and diffraction grating spectroscopes have been widely used as such spectroscopes. However, the acousto-optic tunable filter, abbreviated as AOTF, has spread recently, because of its high-speed and aseismic processing. In the AOTF, an acoustic wave is applied to an acoustic medium consisting in a uniaxial crystal such as a tellurium dioxide ($TeO_2$) crystal. At the same time, a source light beam is radiated onto the acoustic medium to obtain a particular wavelength component of the source light beam as a diffracted ray diffracted within the acoustic medium. Here, the wavelength of the diffracted light is determined by the frequency of the applied acoustic wave, so that the spectrum of the source light beam is obtained by varying the frequency of the acoustic wave and by continuously measuring the intensity of the diffracted ray using a photometer.

The history of the development and advances of the AOTF in recent years is as follows. In 1967, an AOTF of collinear type was first realized for practical use in 1967. Here, the direction in which the acoustic wave travels is the same as the direction in which the light beam travels. However, the most practical and useful AOTFs were not realized until I. C. Chang discovered that $TeO_2$ is an almost ideal crystal material for manufacturing the AOTF and a non-collinear type AOTF was proposed. In the non-collinear type AOTF, the direction in which the acoustic wave travels intersects with the direction in which the light beam travels. During the past 20 years, hundreds of patents and papers have been disclosed, but almost all of these research and development works are based on early theoretical contributions of I. C. Chang, T. Yano, and A. Watanabe, in which momentum matching and phase matching conditions are commonly accepted.

In the early theoretical research and development, physical models for the AOTF were perfect, but the mathematical analysis always depended on approximation methods. In 1985, Mo Fuqin proposed, for the first time, an accurate mathematical description about the parallel-tangent condition. In 1987, Epikhin gave a general system of equations that represent accurate relationships between acoustic parameters and optical parameters. This is one of the greatest contributions to AOTF designing. In 1991, Gass set the acoustic wavevector angle at −80.23° for no particular reason to calculate optimal parameters for the system. In 1992, Ren Quan almost entirely followed the analytic method of Gass's paper and set the acoustic wavevector angle at 105° to calculate a set of parameters for this particular acoustic wavevector angle. However, optimal acoustic wavevector angles have not been given through general study for an entire perfect-phase-matching curve.

As described above, the AOTF has rapidly spread and progressed of recent years, but a number of problems to be solved remain with prior AOTFs. One of the problems is as follows. In the AOTF in general, two diffracted rays, a diffracted ordinary ray of wavelength $\lambda_i$ and a diffracted extraordinary ray of wavelength $\lambda_i'$ are obtained from a source light beam that contains an incident extraordinary ray and an incident ordinary ray, through diffraction within the acoustic medium, depending on the wavelength of the acoustic wave (See FIG. 1). Here, the wavelengths $\lambda_i$ and $\lambda_i'$ are relatively close. A prior AOTF used one of the diffracted rays, usually the diffracted ordinary ray to obtain the spectrum of the source light beam.

However, in the prior AOTF, if the intensity of the source light beam is low, or if the intensity of the components of the source light beam in a wavelength region is low, then the accuracy of spectrometry or the accuracy of the finally obtained spectrum becomes low. For example, in the spectral analysis of measuring the absorption spectrum of an object, it is required to accurately measure the intensity of the light in a wavelength region that is absorbed by the object, but the light intensity is often low in the wavelength region owing to the absorption. Therefore, there has been a problem that the accuracy of the spectral analysis becomes low if an AOTF is used.

SUMMARY OF THE INVENTION

The present invention has been therefore devised to solve the above problem. Its object is to provide an AOTF with means of performing highly accurate spectrometry even if the intensity of the source light beam or the intensity of the components of the source light beam in a wavelength region is low.

The inventors of the present invention mathematically formulated the relationships between various factors and parameters, such as the acoustic wavevector angle, acoustic frequency, optic incident angle, optic diffracted wavevector angle, diffracted ray wavelength, and wavevector surface gap δ, that contribute to the spectral characteristics or diffraction characteristics of the non-collinear type AOTF that uses a uniaxial crystal such as $TeO_2$, based on the perfect conservation-of-momentum condition and the parallel-tangent condition. The inventors of the present invention then mathematically processed the system equations by means of numerical analysis and computer processing to find the following facts (See FIGS. 3 to 7).

In general, a source light beam (incident light) that is incident on such an AOTF is unpolarized light that contains both an incident ordinary ray and an incident extraordinary ray. The incident ordinary ray and the incident extraordinary ray correspond to different acoustic wavelengths by which they are diffracted within the acoustic medium. Therefore, when a source light beam containing an incident ordinary ray and an incident extraordinary ray is diffracted by an acoustic wave of a constant wavelength, the wavelength $\lambda_i$ of the diffracted ordinary ray obtained by the diffraction of the incident extraordinary ray and the wavelength $\lambda_i'$ of the diffracted extraordinary ray obtained by diffraction of the incident ordinary ray are usually different from each other.

However, according to the experiments and mathematical analysis of the inventors of the present invention, if the optic incident angle, which is defined as the angle with the optic axis of the crystal made by the incident source light, is at or near a constant value inherent in the acoustic medium material, then the wavelength $\lambda_i$ of the diffracted ordinary ray and the wavelength $\lambda_i'$ of the diffracted extraordinary ray become approximately identical. The optic incident angle in such a case is called an equivalence incident angle in the following description. The present invention has been made to solve the above problem based on this fact.

According to a first aspect of the present invention, in a non-collinear type AOTF having an acoustic medium formed of an optically transparent uniaxial crystal material, an acoustic wave application means that applies an acoustic wave of an arbitrary wavelength to the acoustic medium, and a light source that radiates a light beam that contains an incident ordinary ray and an incident extraordinary ray onto the acoustic medium in the direction intersecting with the path of the acoustic wave, such that wavelength components, corresponding to the acoustic frequency, of the incident ordinary ray and the incident extraordinary ray are diffracted within the acoustic medium and respectively separated into a monochromatic diffracted extraordinary ray and a monochromatic diffracted ordinary ray, the AOTF of the present invention is characterized in that the optic incident angle is set at an equivalence incident angle for which the wavelength of the diffracted ordinary ray and the wavelength of the diffracted extraordinary ray become approximately identical.

The AOTF preferably has a photometric means that superposes the diffracted ordinary ray with the diffracted extraordinary ray to detect the intensity of the obtained superposed ray. Also, the uniaxial crystal material is preferably a $TeO_2$ crystal.

Further, according to the experiments and analysis of the inventors of the present invention, the equivalence incident angle in the AOTF using the acoustic medium formed of a $TeO_2$ crystal is approximately 56°. Also, the equivalence incident angle weakly depends on the wavelength of the diffracted rays. In fact, the equivalence incident angle becomes greater as the wavelength becomes smaller in the range from 0.5 $\mu$m to 2.5 $\mu$m. However, the difference between the maximum and the minimum values in this range is very small with less than 0.1°.

In this AOTF, the wavelengths of the diffracted ordinary ray and the diffracted extraordinary ray induced by the diffraction within the acoustic medium are substantially identical. Therefore, if the two diffracted rays are superposed with each other, then monochromatic light having a sharp waveform of approximately identical wavelength and doubled intensity can be obtained. This light is hereafter called the superposed diffracted ray. Thus, if the wavelength of the acoustic wave is varied, and the superposed diffracted ray is measured with a photometer, then the monochromatic light or a spectrum whose intensity is twice the one obtained by a prior AOTF is obtained. That is, the transmittance efficiency of the AOTF of the present invention becomes about twice as large as that of a prior AOTF. Therefore, spectrometry of high accuracy can be performed with the present AOTF, even if the intensity of the source light beam or the intensity of the components of the source light beam in a wavelength region is low.

According to a second aspect of the present invention, for a non-collinear type AOTF such that an acoustic wave is applied to an acoustic medium formed of an optically transparent uniaxial crystal material, and such that a source light beam containing an incident ordinary ray and an incident extraordinary ray is radiated onto the acoustic medium in the direction intersecting with the path of the acoustic wave, so that wavelength components, corresponding to the acoustic frequency, of the incident ordinary ray and the incident extraordinary ray are diffracted within the acoustic medium and respectively separated into a monochromatic diffracted extraordinary ray and a monochromatic diffracted ordinary ray, there is provided a method of calculating an equivalence incident angle for which the wavelength of the diffracted ordinary ray and the wavelength of the diffracted extraordinary ray become approximately identical for a single acoustic frequency. The method is characterized in that (a) in a polar coordinate system in which the radius represents the wave number and the angle with the polar axis, which is the optic axis of the crystal, represents the direction of an optic or acoustic wave, (b) based on the conservation of momentum, the relationship between the wavevector of the incident extraordinary ray, the wavevector of the diffracted ordinary ray, and a first acoustic wavevector is formulated, and the vector equation is decomposed into the relationship between the magnitudes and angles of the wavevectors as first equations, (c) the relationship between the magnitude of the incident extraordinary wavevector and the refractive index and vacuum wavelength of the incident extraordinary ray, the relationship between the magnitude of the diffracted ordinary wavevector and the refractive index and vacuum wavelength of the diffracted ordinary ray, and the relationship between the magnitude of the first acoustic wavevector and the velocity and frequency of the first acoustic wavevector are introduced as second equations, (d) the refractive index surfaces that represent the relationships between the refractive indices and wavevector angles are formulated and represented as ellipses in a polar coordinate system, (e) applying the parallel-tangent condition to the ellipses representing the refractive index surfaces, a third equation that express the wavevector angle of the diffracted ordinary ray as a function of the optic incident angle and the wavelength of the diffracted ordinary ray is obtained, and fourth equations that express the refractive indices as functions of the optic incident angle and the wavelength of the diffracted ordinary ray are obtained, (f) based on the first to fourth equations obtained above, a fifth equation that expresses the first acoustic wavevector angle as a function of the optic incident angle and the wavelength of the diffracted ordinary ray is obtained, and a sixth equation that expresses the acoustic frequency of the first acoustic wavevector as a function of the optic incident angle and the wavelength of the diffracted ordinary ray is obtained, (g) based on the conservation of momentum, the relationship between the wavevector of the incident ordinary ray, the wavevector of the diffracted extraordinary ray, and a second acoustic wavevector is formulated, and the vector equation is decomposed into the relationship between the magnitudes and the angles of the wavevectors as seventh equations, (h) the relationship between the magnitude of the incident ordinary wavevector and the refractive index and vacuum wavelength of the incident ordinary ray, the relationship between the magnitude of the diffracted extraordinary wavevector and the refractive index and vacuum wavelength of the diffracted extraordinary ray, and the relationship between the magnitude of the second acoustic wavevector and the velocity and frequency of the second acoustic wavevector are introduced as eighth equations, (i) the refractive index surfaces that represent the relationships between the refractive indices and wavevector angles are formulated and represented as ellipses in a polar coordinate system, (j) applying the parallel-tangent condition to the ellipses representing the refractive index surfaces, a ninth equation that expresses the wavevector angle of the diffracted extraordinary ray as a function of the optic incident angle and the wavelength of the diffracted extraordinary ray is obtained, and tenth equations that express the refractive indices as functions of the optic incident angle and the wavelength of the diffracted extraordinary ray are obtained, (k) based on the seventh to tenth equations obtained above, an eleventh equation that expresses the second acoustic wavevector angle as a function of the optic incident angle and the wavelength of the diffracted extraordinary ray is obtained, and a twelfth equation that expresses the acoustic frequency of the second acoustic wavevector as a function of the optic incident angle and the wavelength of the diffracted extraordinary ray is obtained, (1) an optic incident angle such that the first acoustic wavevector angle obtained by the fifth equation is equal to the second acoustic wavevector angle obtained by the eleventh equation is obtained as an equivalence incident angle, or an optic incident angle such that the first acoustic frequency obtained by the sixth equation is equal to the second acoustic frequency obtained by the twelfth equation is obtained as an optic incident angle.

In the present method of calculating the equivalence incident angle, the difference or gap δ between the wavevector surface of extraordinary rays and the wavevector surface of ordinary rays on the Z-axis (optic axis of the crystal) is preferably set at a nonzero value, for example 0.0005.

In fact, it is known that the gap δ is nonzero in actual AOTFs. If δ is set at 0, then the accuracy of the obtained equivalence incident angle becomes slightly lower, but the computation process becomes very simple. Therefore, if the accuracy is not so strictly demanded, the gap δ may be set at 0. Incidentally, the gap δ has been reluctantly set at 0 in prior AOTFs, since if the gap δ is set at a nonzero value, then the computation and analysis become extremely complex. However, according to the method of the present invention, the computation can be easily performed even if the gap δ is set at a nonzero value.

Thus, according to the present method, the equivalence incident angle for the acoustic medium formed of a predetermined uniaxial crystal material can be accurately and easily calculated. Therefore, the AOTF of the present invention is easily designed, and the accuracy of spectroscopy is enhanced by the use of the AOTF.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the accompanying drawings throughout which like parts are designated by like reference numerals, and in which.

DETAILED DESCRIPTION OF THE PREFERRED EMBODIMENT

A preferred embodiment according to the present invention will be described below in conjunction with the attached drawings.

Figure 1:
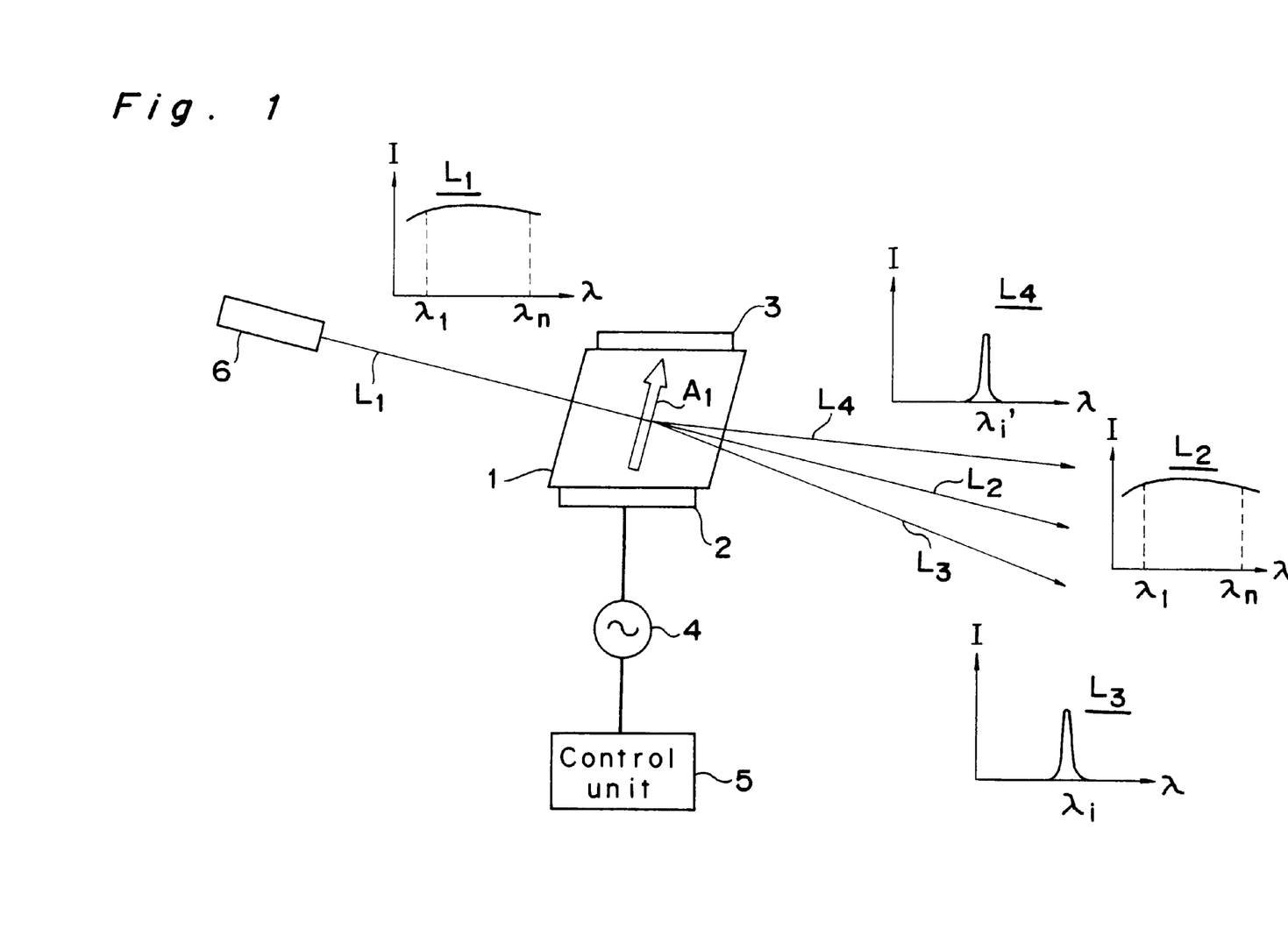
FIG. 1 is a schematic illustration that shows the system configuration of an AOTF in accordance with the present invention.

As shown in FIG. 1, in an acousto-optic tunable filter (AOTF) in accordance with the present invention, a transducer 2 that applies an acoustic wave into an acoustic medium 1 (AOTF cell) formed of a $TeO_2$ crystal is attached to one end (top end) of acoustic medium 1. An absorber 3 that absorbs the acoustic wave propagating through acoustic medium 1 as shown by the arrow $A_1$ is attached to the other end (upper end) of acoustic medium 1. Transducer 2 is driven by a tunable acoustic wave driver 4 that is controlled by a control unit 5. Transducer 2 can generate an acoustic wave of an arbitrary frequency.

A source light beam (incident light beam) $L_1$ that is formed of white light of broad bandwidth is radiated from a light source 6 onto one side (left side) of acoustic medium 1. The source light beam $L_1$ is separated into a 0-order ray $L_2$, a diffracted ordinary ray $L_3$ (+1 order), and a diffracted extraordinary ray $L_4$ (−1 order) during the time when it passes through acoustic medium 1. Here the 0-order ray $L_2$ is formed of monochromatic light of broad bandwidth having a similar spectrum as the source light beam $L_1$, that is, the one obtained by deleting the diffracted ordinary ray $L_3$ and the diffracted extraordinary ray $L_4$ from the source light beam $L_1$. The diffracted ordinary ray $L_3$ and the diffracted extraordinary ray $L_4$ are respectively formed of monochromatic light of wavelengths $\lambda_i$ and $\lambda_i'$ and have been separated from the source light beam $L_1$ by the primary diffraction. The incident angle of source light beam $L_1$ is set approximately at 90°.

The reason why the two diffracted rays $L_3$ and $L_4$ are induced by diffraction in acoustic medium 1 from the source light beam $L_1$ is well known, so that its detailed description is omitted from here. When the acoustic wave propagates within acoustic medium 1 as shown by the arrow $A_1$, the crystal lattice of $TeO_2$ is distorted owing to the acoustic wave, so that the distorted lattice functions as a grating. As a result, wavelength components corresponding to the acoustic frequency of the source light beam $L_1$ are diffracted, so that the monochromatic diffracted rays $L_3$ and $L_4$ occur and travel in directions different from the path of the 0-order ray $L_2$. In this case, the diffracted ordinary ray $L_3$ is obtained from the incident extraordinary ray of source light beam, and the diffracted extraordinary ray $L_4$ is obtained from the incident ordinary ray of the source light beam $L_1$.

This diffraction phenomenon is also explained in terms of the quantum theory. According to the quantum theory, an acoustic wave is considered as particles called phonons that have momentum or energy corresponding to its frequency. The incident extraordinary ray and the incident ordinary ray are considered as photons that have momentum or energy corresponding to their frequencies (or wavelengths). Photons can form new photons by uniting with phonons or discharging phonons within a range of the conservation of energy or the conservation of momentum. Therefore, the photons in the incident ordinary ray collide and unite with phonons in acoustic medium 1 to become new photons with a new direction, forming the diffracted extraordinary ray. On the other hand, the photons in the incident extraordinary ray discharge phonons to become new photons with a new direction, forming the diffracted ordinary ray.

As described above, in a prior AOTF, the intensity of the diffracted ordinary ray is measured to perform the spectrometry of the source light beam, that is, to obtain the spectrum of the source light beam, while the acoustic frequency is varied. However, there has been a problem that the accuracy of spectrometry decreases, if the intensity of the source light beam is low, or if the intensity of the components of the source light beam in a wavelength region is low.

In contrast, in the AOTF of the present invention, spectrometry is performed in the following method, so that spectrometry can be performed with high accuracy, even if the intensity of the source light beam is low, or even if the intensity of the components of the source light beam in a wavelength region is low.

In the present AOTF, the incident angle of the source light beam $L_1$ radiated from light source 6 is set at an equivalence incident angle for which the wavelength $\lambda_i$ of the diffracted ordinary ray $L_3$ and the wavelength $\lambda_i'$ of the diffracted extraordinary ray $L_4$ become substantially identical. Then the diffracted ordinary ray $L_3$ and the diffracted extraordinary ray $L_4$ are superposed to form a superposed diffracted ray. The intensity of the superposed diffracted ray is detected by a photometer (not illustrated in FIG. 1). The spectrometry of the source light beam $L_1$ is performed to obtain its spectrum by measuring the intensity of the superposed diffracted ray while varying the frequency of the acoustic wave applied to acoustic medium 1 by transducer 2.

In the superposed diffracted ray, the width of the spectral curve, which is obtained by plotting the light intensities, that is, the width of the wavelength band is approximately the same as that of the diffracted ordinary ray $L_3$ or the diffracted extraordinary ray $L_4$. The height (light intensity) of the spectral curve is approximately twice the diffracted ordinary ray $L_3$ or the diffracted extraordinary ray $L_4$. Therefore, the spectral curve of the superposed diffracted ray becomes a very sharp shape. Thus, spectrometry is performed based on the superposed diffracted ray having a sharp spectral characteristic with the light intensity twice as high as that obtained by a prior AOTF and with the wavelength band the same as that obtained by a prior AOTF. Therefore, accurate spectrometry can be performed even if the intensity of the source light beam is low, or even if the intensity of the components of the source light beam in a wavelength region is low.

In this way, in the present AOTF, the incident angle of the source light beam $L_1$ is set at the equivalence incident angle, so that the accuracy of spectrometry is enhanced. A method of calculating the equivalence incident angle is described in the following.

Figure 2:
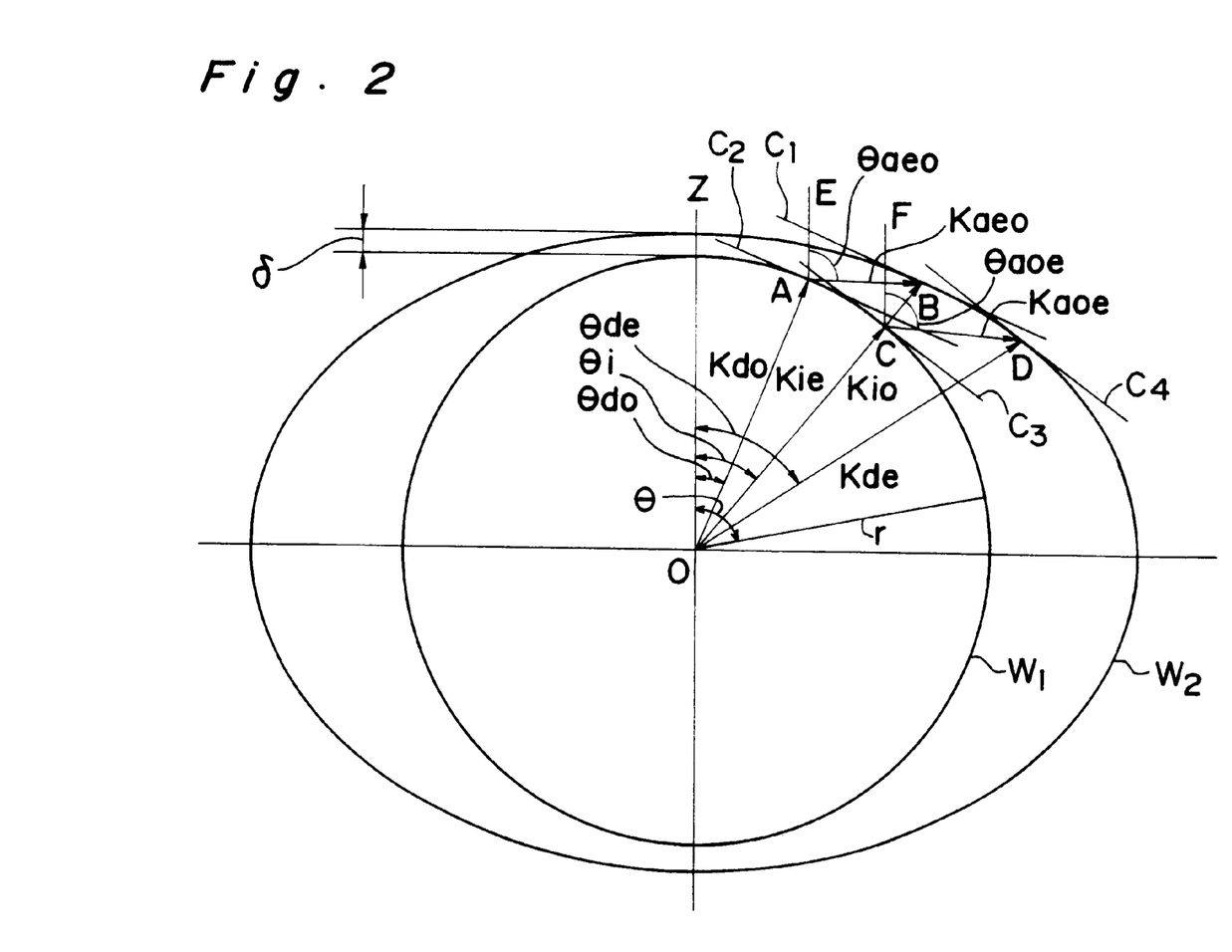
FIG. 2 is an illustration that shows the relationship between optic incident wavevectors, optic diffracted wavevectors, and acoustic wavevector in a polar coordinate system.

(1) First, as shown in FIG. 2, two ellipses $W_1$, $W_2$ respectively representing the wavevector surface of the ordinary rays and the wavevector surface of the extraordinary rays are schematically described in a polar coordinate system in which the radius represents the wave number and the angle with the polar axis, which is the optic axis (Z-axis) of the crystal, represents the direction of an optic or acoustic wave. In an optic or acoustic wavevector, its direction represents the direction in which an optic ray or an acoustic wave travels, and its magnitude represents the wave number of the optic ray or the acoustic wave. The diffracted ordinary ray wavevector $K_{do}$ corresponding to a known incident extraordinary ray wavevector $K_{ie}$ is determined by the parallel-tangent condition.

(2) Based on the conservation of momentum, the relationship between the wavevector $K_{ie}$ of the incident extraordinary ray, the wavevector $K_{do}$ of the diffracted ordinary ray, and a first acoustic wavevector $K_{aeo}$ is formulated. Further, the vector equation is decomposed into the relationship between the magnitudes and the angles of the wavevectors as first equations (See equations (1)).

(3) The relationship between the magnitude $K_{ie}$ of the incident extraordinary wavevector and the refractive index $n_{ie}$ and vacuum wavelength $\lambda_0$ of the incident extraordinary ray, the relationship between the magnitude $K_{do}$ of the diffracted ordinary wavevector and the refractive index $n_{do}$ and vacuum wavelength $\lambda_0$ of the diffracted ordinary ray, and the relationship between the magnitude $K_{aeo}$ of the first acoustic wavevector and the velocity $V_a$ and frequency $f_{aeo}$ of the first acoustic wavevector are introduced as second equations. (See equations (2)).

(4) The relationship between the refractive index $n_{ie}$ and the incident angle $\theta_i$ of the incident extraordinary ray and the relationship between the refractive index $n_{do}$ of the diffracted ordinary ray and the wavevector angle $\theta_{do}$ of the diffracted ordinary ray are introduced as refractive index surfaces corresponding to the wavevector surfaces, with dispersion equations that determine the values of parameters $n_o(\lambda)$ and $n_e(\lambda)$, where $\lambda$ is the wavelength of the diffracted ordinary ray. The refractive index surfaces are also represented as ellipses in a polar coordinate system. In particular the ellipse for the ordinary ray becomes a circle if $\delta=0$.

(5) Applying the parallel-tangent condition to the ellipses that represent the refractive index surfaces introduced in the procedure (4), a third equation that expresses $\theta_{do}$ as a function of $\theta_i$ and $\lambda$ is obtained (See equation (3) for $\delta=0$ and equations (16) for $\delta\neq 0$). Then, based on this function and the ellipses representing the refractive index surfaces, fourth equations that respectively express the refractive indices $n_{ie}$, $n_{do}$ as functions of $\theta_i$ and $\lambda$ are obtained (See equation (4) for $\delta=0$, and equations (17) for $\delta\neq 0$).

(6) Based on the first to fourth equations obtained in the above procedures (1) to (5), the angle $\theta_{aeo}$ of the first acoustic wavevector is obtained as a function of $\theta_i$ and $\lambda$ (See equation (5) or (7) for $\delta=0$ and equation (18) for $\delta\neq 0$). This fifth equation represents a perfect phase matching condition for the angle $\theta_{aeo}$ of the first acoustic wavevector and the optic incident angle $\theta_i$ depending on the wavelength $\lambda$.

(7) Based on the equations obtained in the above procedures (1) to (5), the acoustic frequency $f_{aeo}$ of the first acoustic wavevector is obtained as a function of $\theta_i$ and $\lambda$ (See equation (6) or (8) for $\delta=0$ and equation (19) for $\delta\neq 0$). This sixth equation represents a perfect phase matching condition for the acoustic frequency $f_{aeo}$ of the first acoustic wavevector and the optic incident angle $\theta_i$ depending on the wavelength $\lambda$.

(8) From the two ellipses $W_1$, $W_2$ respectively representing the wavevector surfaces of ordinary rays and extraordinary rays, the diffracted ordinary wavevector $K_{de}$ corresponding to a known incident ordinary wavevector $K_{io}$ is determined by the parallel-tangent condition.

(9) Based on the conservation of momentum, the relationship between the wavevector $K_{io}$ of the incident ordinary ray, the wavevector $K_{de}$ of the diffracted extraordinary ray, and a second acoustic wavevector $K_{aoe}$ is formulated. Further, the vector equation is decomposed into the relationship between the magnitudes and the angles of the wavevectors as seventh equations (See equation (9)).

(10) The relationship between the magnitude $K_{io}$ of the incident extraordinary wavevector and the refractive index $n_{io}$ and vacuum wavelength $\lambda_0$ of the incident ordinary ray, the relationship between the magnitude $K_{de}$ of the diffracted extraordinary wavevector and the refractive index $n_{de}$ and vacuum wavelength $\lambda_0$ of the diffracted extraordinary ray, and the relationship between the magnitude $K_{aoe}$ of the second acoustic wavevector and the velocity $V_a$ and frequency $f_{aoe}$ of the second acoustic wavevector are introduced as eighth equations. (See equation (10)).

(11) The relationship between the refractive index $n_{io}$ and the incident angle $\theta_i$ of the incident ordinary ray and the relationship between the refractive index $n_{de}$ of the diffracted extraordinary ray and the wavevector angle $\theta_{de}$ of the diffracted extraordinary ray are introduced as refractive index surfaces corresponding to the wavevector surfaces, with dispersion equations that determine the values of parameters $n_o(\lambda)$ and $n_e(\lambda)$, where $\lambda$ is the wavelength of the diffracted extraordinary ray. The refractive index surfaces are also represented as ellipses in a polar coordinate system. In particular the ellipse for the ordinary ray becomes a circle if $\delta=0$.

(12) Applying the parallel-tangent condition to the ellipses that represent the refractive index surfaces introduced in the procedure (11), a ninth equation that expresses $\theta_{de}$ as a function of $\theta_i$ and $\lambda$ is obtained (See equation (11) for $\delta=0$ and (16)' for $\delta\neq 0$). Then, based on this ninth equation and the ellipses representing the refractive index surfaces, tenth equations that respectively express $n_{io}$ and $n_{de}$ as functions of $\theta_i$ and $\lambda$ are obtained (See equations (12) for $\delta=0$ and (17)' for $\delta\neq 0$).

(13) Based on the seventh to tenth equations obtained in the above procedures (8) to (12), the angle $\theta_{aoe}$ of the second acoustic wavevector is obtained as a function of $\theta_i$ and $\lambda$ (See equation (13) for $\delta=0$ and equation (20) for $\delta\neq 0$). This eleventh equation represents a perfect phase matching condition for the second acoustic wavevector angle $\theta_{aoe}$ and the optic incident angle $\theta_i$ depending on the wavelength $\lambda$.

(14) Based on the seventh to tenth equations obtained in the above procedures (8) to (12), the acoustic frequency $f_{aoe}$ is obtained as a function of $\theta_i$ and $\lambda$ (See equation (14) for $\delta=0$ and equation (21) for $\delta\neq 0$). This twelfth equation represents a perfect phase matching condition for the second acoustic frequency $f_{aoe}$ and the optic incident angle $\theta_i$ depending on the wavelength $\lambda$.

(15) An optic incident angle $\theta_i$ for which the first acoustic wavevector angle $\theta_{aeo}$ obtained by the fifth equation is equal to the second acoustic wavevector angle $\theta_{aoe}$ obtained by the eleventh equation is obtained. This is an equivalence incident angle. Further, an optic incident angle $\theta_i$ for which the first acoustic frequency $f_{aeo}$ obtained by the sixth equation is equal to the second acoustic frequency $f_{aoe}$ obtained by the twelfth equation is obtained. This is also an equivalence incident angle.

In the present method of obtaining the equivalence incident angle, the difference or gap $\delta$ between the wavevector surface $W_1$ and the wavevector surface $W_2$ on the Z-axis (optic axis of the crystal) is preferably set at a nonzero value, for example $4.55\times 10^{-4}$ (See equation (15)). Thus, according to the present method, the equivalence incident angle for the acoustic medium formed of a predetermined uniaxial crystal material can be accurately and easily calculated.

In the above procedures, the suffix $_{aeo}$ of $\theta_{aeo}$ and $f_{aeo}$ signifies the acoustic wavevector angle or acoustic frequency for the optic combination of the extraordinary incident ray and the diffracted ordinary ray. This optic combination is hereafter called e-in o-out, and the reverse optic combination is called o-in e-out.

(MATHEMATICAL FORMULATION OF THE STATE OR BEHAVIOR OF THE AOTF)

Mathematical procedures or analytical techniques for calculating the equivalence incident angle in accordance with the present invention are described in the following with the results of the analysis and the actual processing that are in line with the procedures.

Referring to FIG. 2, the state or behavior of the AOTF is represented in terms of modelling equations. In FIG. 2, the cross-section $W_1$, $W_2$ of the wavevector surface are respectively described as a circle and an ellipse. The Z-axis, which is also the polar axis of the polar coordinate system, represents the [001] optic axis of the uniaxial crystal. The gap $\delta$ is a physical constant. The vectors OC and OB are respectively the wavevector $K_{io}$ of the incident ordinary ray and the wavevector $K_{ie}$ of the incident extraordinary ray having an identical incident angle $\theta_i$. Further, the diffracted ordinary ray is represented by the wavevector $K_{do}$ having the angle $\theta_{do}$ with the z-axis and is induced by interaction of the incident extraordinary ray represented by the wavevector $K_{ie}$ and the acoustic wave represented by the wavevector $K_{aeo}$ having the angle $\theta_{aeo}$ with the Z-axis. Similarly, the diffracted extraordinary ray is represented by the wavevector $K_{de}$ having the angle $\theta_{de}$ with the Z-axis and is induced by interaction of the incident ordinary ray represented by the wavevector $K_{io}$ and the acoustic wave represented by the wavevector $K_{aoe}$ having the angle $\theta_{aoe}$ with the Z-axis.

Now, the parallel-tangent condition is represented as follows. A first tangent line $C_1$ to the ellipse $W_2$ is formed at the point B where the incident extraordinary wavevector $K_{ie}$=OB intersects with the ellipse $W_2$. Then a second line $C_2$ that is parallel to $C_1$ and tangent to the circle $C_1$ is formed. The point of contact A where the second tangent line $C_2$ touches the circle $W_1$ forms the vector OA, which becomes the diffracted ordinary wavevector $K_{do}$. Similarly, a third tangent line $C_3$ to the circle $W_1$ is formed at the point C where the incident ordinary wavevector $K_{io}$=OC intersects with the circle $W_1$. Then a fourth line $C_4$ that is parallel to $C_3$ and tangent to the ellipse $W_2$ is formed. The point of contact D where the fourth tangent line $C_4$ touches the ellipse $W_2$ forms the vector OD, which becomes the diffracted extraordinary wavevector $K_{de}$.

Now, in the case where the incident extraordinary wavevector $K_{ie}$ and the acoustic wavevector $K_{aeo}$ generate the diffracted ordinary wavevector $K_{do}$, the conservation of momentum requires $$K_{aeo}=K_{ie}-K_{do}$$

That is, $$K_{aeo}\cdot\sin\theta_{aeo}=K_{ie}\cdot\sin\theta_i-K_{do}\cdot\sin\theta_{do},$$

$$K_{aeo}\cdot\cos\theta_{aeo}=K_{ie}\cdot\cos\theta_i-K_{do}\cdot\cos\theta_{do}. \quad (1)$$

Further, the magnitudes of the optic wavevectors and acoustic wavevector are expressed by the following formulas (2).

$$K_{ie}=2\pi n_{ie}/\lambda_o, K_{do}=2\pi n_{do}/\lambda_o, K_{aeo}=2\pi f_{aeo}/V_a, \quad (2)$$

where $n_{ie}$ is the refractive index of the incident extraordinary ray, $n_{do}$ is the refractive index of the diffracted ordinary ray, $f_{aeo}$ is the acoustic frequency, $V_a$ is the acoustic velocity, and $\lambda_o$ is the vacuum wavelength of the incident and diffracted rays.

CASE: $\delta=0$.

In the following is described the case $\delta=0$. Let the wavelength of the diffracted ordinary ray be $\lambda$. First, refractive indices $n_o(\lambda)$ and $n_e(\lambda)$ are determined by the dispersion equations $$n_o^2(\lambda)=1+2.5844\lambda^2/(\lambda^2-0.1342^2)+1.1557\lambda^2/(\lambda^2-0.2638^2),$$

$$n_e^2(\lambda)=1+2.8525\lambda^2/(\lambda^2-0.1342^2)+1.5141\lambda^2/(\lambda^2-0.2631^2).$$

As shown by Mo Fuqin and V. M. Epikhin, the refractive index surface for the ordinary ray is represented by the circle with the radius $n_o(\lambda)$. On the other hand, the refractive index surface for the extraordinary ray is represented by the ellipse $$1/n_{ie}^2=\cos^2\theta_i/n_o^2(\lambda)+\sin^2\theta_i/n_e^2(\lambda).$$

Note that these circle and ellipse are respectively geometrically similar to $W_1$ and $W_2$ with the similitude ratio $\lambda_o/2\pi$. Applying the parallel-tangent condition, which was also used by I. C. Chang and Mo Fuqin, to the circle and the ellipse that represent the refractive index surfaces, we obtain $\theta_{do}$ as a function of $\theta_i$ and $\lambda$.

$$\tan\theta_{do}=\tan\theta_{do}(\theta_i,\lambda)=[n_o(\lambda)/n_e(\lambda)]^2\cdot\tan\theta_i \quad (3)$$

Therefore, $$n_{ie}=n_{ie}(\theta_i,\lambda)=(\cos^2\theta_i/n_o^2(\lambda)+\sin^2\theta_i/n_e^2(\lambda))^{-\frac{1}{2}},$$

$$n_{do}=n_o(\lambda). \quad (4)$$

Now, from the equations (1), (2), (3), and (4), we obtain the following equation that expresses the acoustic wavevector angle $\theta_{aeo}$ as a function of the incident angle $\theta_i$ and the diffracted ray wavelength $\lambda$.

$$\tan(\theta_{aeo})=\tan[\theta_{aeo}(\theta_i,\lambda)]$$

$$\tan(\theta_{aeo}) = \tan[\theta_{aeo}(\theta_i,\lambda)] \quad (5)$$
$$= \frac{n_{ie}(\theta_i,\lambda)\cdot\sin\theta_i - n_o(\lambda)\cdot\sin[\theta_{do}(\theta_i,\lambda)]}{n_{ie}(\theta_i,\lambda)\cdot\cos\theta_i - n_o(\lambda)\cdot\cos[\theta_{do}(\theta_i,\lambda)]}$$

Also, from the equations (1), (2), (3), and (4), we obtain the following equation that expresses the acoustic δfrequency $f_{aeo}$ as a function of $\theta_i$ and $\lambda$.

$$f_{aeo}=f_{aeo}(\theta_i,\lambda)=(V_a/\lambda_o)[n_{ie}^2(\theta_i,\lambda)+n_o^2(\lambda)-2n_{ie}(\theta_i,\lambda)\cdot n_o(\lambda)\cdot\cos(\theta_{do}(\theta_i,\lambda)-\theta_i)]^{1/2}. \quad (6)$$

Now, in order to simplify further analysis, let $$a=n_e(\lambda)/n_o(\lambda), \quad x=\tan(\theta_i).$$

Then it follows from the equations (5) and (6) that $$\tan\theta_{aeo} = \frac{a^3 + \sqrt{(x^2+a^4)(x^2+a^2)}}{ax} \quad (7)$$

$$f_{aeo} = \frac{V_a n_o(\lambda)}{\lambda_0}\sqrt{1 + \frac{a^2(1+x^2)}{a^2+x^2} - 2a\sqrt{\frac{a^2+x^2}{a^4+x^2}}} \quad (8)$$

Similarly, following the techniques used by Mo Fuqin and V. M. Epikhin, the relationships between the incident ordinary ray and the diffracted extraordinary ray is obtained as the following equations (9) to (14). Here the suffix $_{aoe}$ means the angle or frequency of the acoustic wavevector in the optical combination of o-in and e-out. First, the conservation of momentum requires $$K_{aoe}=K_{de}-K_{io}$$

That is, $$K_{aoe}\cdot\sin\theta_{aeo}=K_{de}\cdot\sin\theta_{de}-K_{io}\cdot\sin\theta_i,$$

$$K_{aoe}\cdot\cos\theta_{aeo}=K_{de}\cdot\cos\theta_{de}-K_{io}\cdot\cos\theta_i. \quad (9)$$

Further, $$K_{de}=2\pi n_{de}/\lambda_o, K_{io}=2\pi n_{io}/\lambda_o, K_{aoe}=2\pi f_{aoe}/V_a. \quad (10)$$

where $n_{de}$ is the refractive index of the diffracted extraordinary ray, $n_{io}$ is the refractive index of the incident ordinary ray, $f_{aoe}$ is the acoustic frequency, $V_a$ is the acoustic velocity, and $\lambda_o$ is the vacuum wavelength of the incident and diffracted rays.

Let the wavelength of the diffracted extraordinary ray be $\lambda$. Then the refractive index surface for the ordinary ray is represented by the circle with the radius $n_o(\lambda)$. On the other hand, the refractive index surface for the extraordinary ray is represented by the ellipse $$1/n_{de}^2=\cos^2\theta_{de}/n_o^2(\lambda)+\sin^2\theta_{de}/n_e^2(\lambda).$$

Applying the parallel-tangent condition to the circle and the ellipse, we obtain the following relationship between $\theta_i$ and $\theta_{de}$.

$$\tan\theta_{de}=\tan\theta_{de}(\theta_i,\lambda)=[n_e(\lambda)/n_o(\lambda)]^2\cdot\tan\theta_i. \quad (11)$$

Therefore, $$n_{io}=n_o(\lambda),$$

$$n_{de}=n_{de}(\theta_i,\lambda)=[\cos^2\theta_{de}(\theta_i,\lambda)/n_o^2(\lambda)+\sin^2\theta_{de}(\theta_i,\lambda)/n_e^2(\lambda)]^{-\frac{1}{2}}. \quad (12)$$

Further, from the equations (9), (10), (11), and (12), it follows that $$\tan\theta_{aoe} = \frac{1+\sqrt{(x^2+1)(a^2x^2+1)}}{x} \quad (13)$$

$$f_{aoe} = \frac{V_a n_o(\lambda)}{\lambda_0}\sqrt{1 + \frac{1+a^4x^2}{1+a^2x^2} - 2a\sqrt{\frac{1+a^2x^2}{1+x^2}}} \quad (14)$$

where $a=n_e(\lambda)/n_o(\lambda)$, $x=\tan(\theta_i)$.

CASE: $\delta\neq 0$.

Warner et al. showed that the gap $\delta$ is not 0 as shown in the following equation (15), based on experiments and detailed physical analysis. Therefore, the prior physical model used by Mo Fuqin and V. M. Epikhin described above is not accurate. Let $\lambda$ be the wavelength of the diffracted ray. Then $$\delta(\lambda)=[n_{ie}(0,\lambda)-n_{do}(0,\lambda)]/2n_o(\lambda)\approx 4.55\times 10^{-4}. \quad (15)$$

The case $\delta\neq 0$ is described in the following. The following equations are formulated as perfect phase-matching conditions.

The refractive index surface for the extraordinary ray is represented by the ellipse $$1/n_{ie}^2=\cos^2\theta_i/[(1+\delta)^2 n_o^2(\lambda)]+\sin^2\theta_i/n_e^2(\lambda)$$

Further, the refractive index surface for the ordinary ray is no longer represented by a circle but represented by the ellipse $$1/n_{do}^2 = \cos^2\theta_{do}/[(1-\delta)^2 n_o^2(\lambda)] + \sin^2\theta_{do}/n_o^2(\lambda).$$

First, $\theta_{do}$ is obtained as a function $\theta_{do}(\theta_i, \lambda)$ as follows. The slope $K_e$ of the tangent line of the ellipse representing the refractive index surface for the extraordinary ray at the locus determined by $\theta_i$ is $$K_e = [(1+\delta)^2 n_o^2(\lambda)/n_e^2(\lambda)] \cdot \tan \theta_i.$$

Similarly, the slope $K_o$ of the tangent line of the ellipse representing the refractive index surface for the ordinary ray at the locus determined by $\theta_{do}$ is $$K_o = [(1-\delta)^2 n_o^2(\lambda)/n_o^2(\lambda)] \cdot \tan \theta_{do}.$$

The parallel-tangent condition requires $K_e = K_o$. Therefore, $$\tan \theta_{do}(\theta_i, \lambda) = \{[(1+\delta)n_o(\lambda)]/[(1-\delta)n_e(\lambda)]\}^2 \cdot \tan \theta_i. \quad (16)$$

Therefore, from the above ellipses, it follows that $$n_{ie} = n_{ie}(\theta_i, \lambda) = \{\cos^2\theta_i/[(1+\delta)n_o^2(\lambda)] + \sin^2\theta_i/n_e^2(\lambda)\}^{-\frac{1}{2}},$$

$$n_{do} = n_{do}(\theta_i, \lambda) = \{\cos^2\theta_{do}(\theta_i,\lambda)/[(1-\delta)^2 n_o^2(\lambda)] + \sin^2\theta_{do}(\theta_i,\lambda)/n_o^2(\lambda)\}^{-\frac{1}{2}}. \quad (17)$$

Similarly, we obtain $$\tan \theta_{de}(\theta_i, \lambda) = \{[(1-\delta)n_e(\lambda)]/[(1+\delta)n_o(\lambda)]\}^2 \cdot \tan \theta_i. \quad (16)'$$

$$n_{io} = n_{io}(\theta_i, \lambda) = \{\cos^2\theta_i/[(1-\delta)^2 n_o^2(\lambda)] + \sin^2\theta_i/n_o^2(\lambda)\}^{-\frac{1}{2}}.$$

$$n_{de} = n_{de}(\theta_i, \lambda) = \{\cos^2\theta_{de}(\theta_i,\lambda)/[(1+\delta)^2 n_o^2(\lambda)] + \sin^2\theta_{de}(\theta_i,\lambda)/n_e^2(\lambda)\}^{-\frac{1}{2}}. \quad (17)'$$

In order to simplify the further analysis, let $$b = (1-\delta)n_e(\lambda)/[(1+\delta)n_o(\lambda)], \quad y = (1-\delta)\tan \theta_i.$$

Then from the equations (1), (2), (9), (10), (16), (17), (16)', and (17)', it follows that $$\tan\theta_{aeo} = \frac{y\left[(1+\delta)b^2\sqrt{b^4+y^2} - (1-\delta)\sqrt{b^4+b^2y^2}\right]}{b^2\left[(1-\delta^2)\sqrt{b^4+y^2} - (1-\delta)^2\sqrt{b^4+b^2y^2}\right]} \quad (18)$$

$$f_{aeo} = \frac{V_a n_o(\lambda)}{\lambda_0} \cdot \quad (19)$$

$$\sqrt{\frac{b^2(1+\delta)^2[(1-\delta)^2+y^2]}{(1-\delta)^2(b^2+y^2)} + \frac{(1-\delta)^2 b^4+y^2}{b^4+y^2} - \frac{2b(1+\delta)[(1-\delta)^2 b^2+y^2]}{(1-\delta)\sqrt{(b^2+y^2)(b^4+y^2)}}}$$

$$\tan\theta_{aoe} = \frac{y\left[(1-\delta)\sqrt{1+b^2y^2} - (1+\delta)b^2\sqrt{1+y^2}\right]}{(1-\delta^2)\sqrt{1+b^2y^2} - (1+\delta)\sqrt{1+y^2}} \quad (20)$$

$$f_{aoe} = \frac{V_a n_o(\lambda)}{\lambda_0} \cdot \quad (21)$$

$$\sqrt{\frac{(1+\delta)^2[(1-\delta)^2+b^4y^2]}{(1-\delta)^2(1+b^2y^2)} + \frac{(1-\delta)^2+y^2}{1+y^2} - \frac{2(1+\delta)[(1-\delta)^2+b^2y^2]}{(1-\delta)\sqrt{1+b^2y^2}(1+y^2)}}$$

(ANALYTICAL RESULTS)

The equivalence incident angle in accordance with the present invention is calculated by numerical analysis and computer processing based on the above equations. In the following are described analytical results obtained by actual numerical analysis and computer processing conducted by the present inventors.

Figure 3:
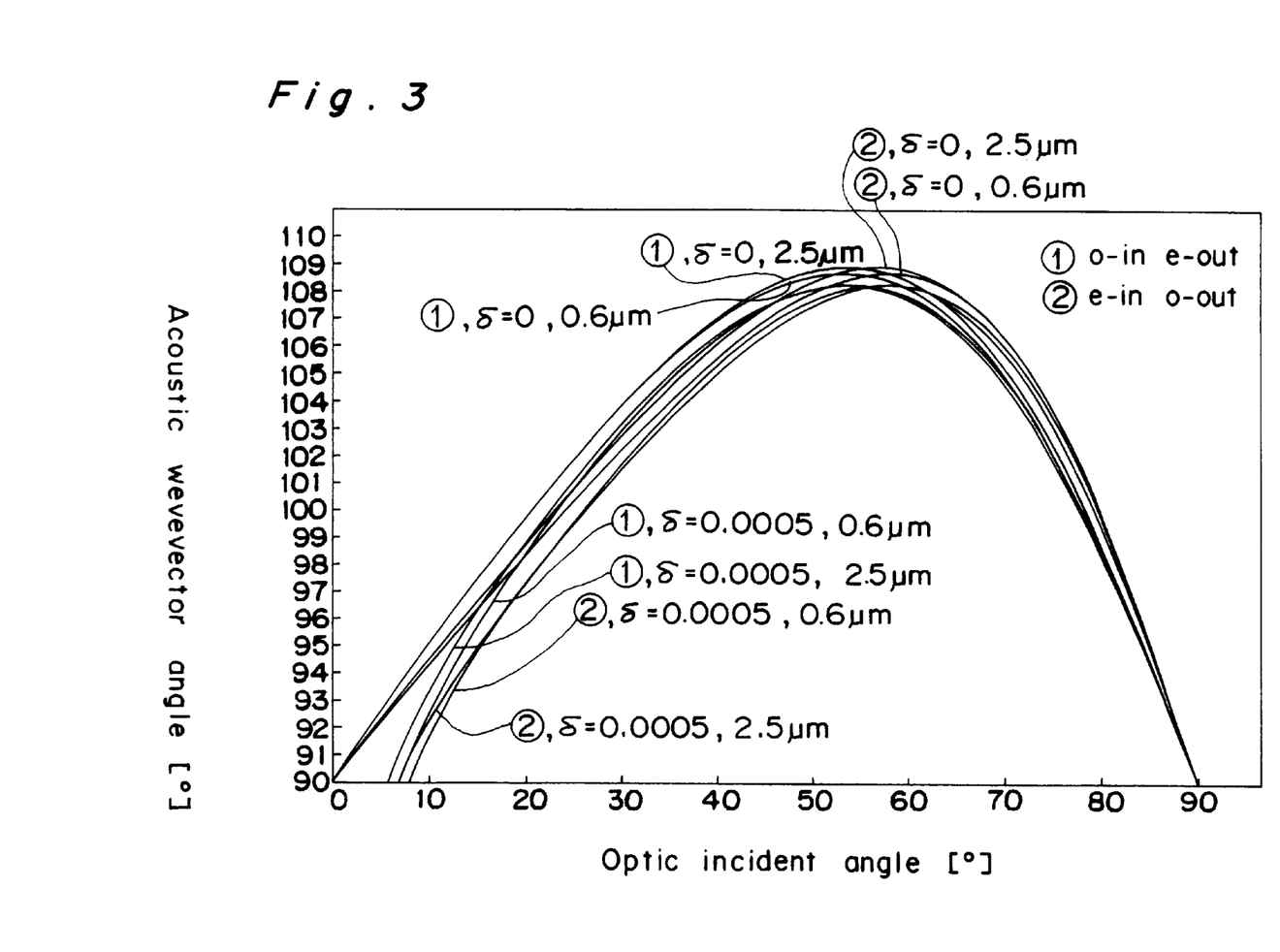
FIG. 3 is a graph that shows the relationship between the acoustic wavevector angle, the optic incident angle, and the wavelength of the diffracted rays.

FIG. 3 illustrates the results obtained by the numerical processing using computers based on the equations (7), (13), (18), and (20). In this processing, the optic incident angle $\theta_i$ was varied from 0 to 90° and the acoustic wavevector angle (acoustic wave angle) was calculated. The processing was conducted for both optical combinations of o-in e-out and e-in o-out and for $\delta=0$ and $\delta=0.0005$. The wavelengths $\lambda$ of the diffracted rays were 0.6 μm and 2.5 μm.

Figure 4:
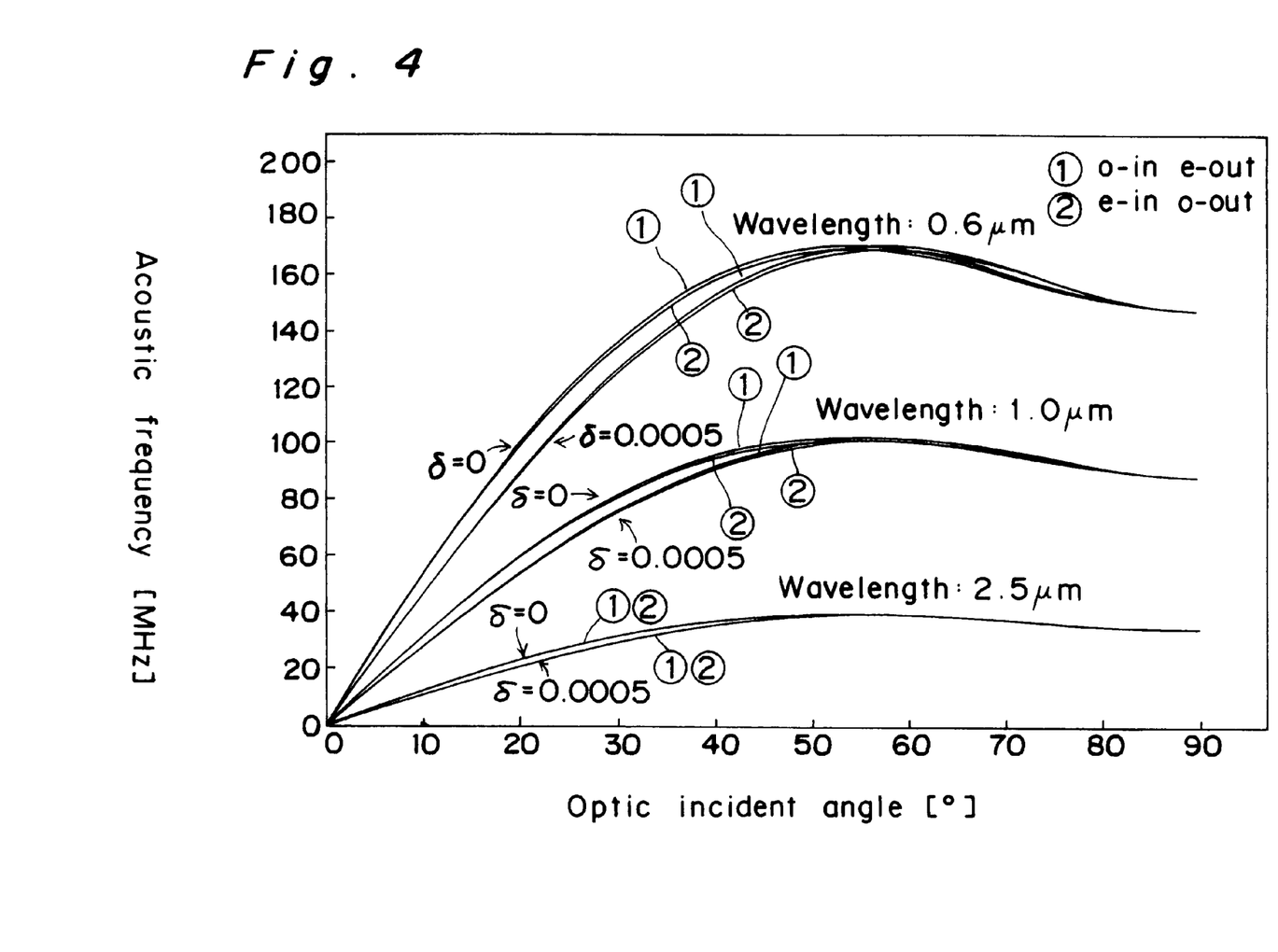
FIG. 4 is a graph that shows the relationship between the acoustic frequency, the optic incident angle, and the wavelength of the diffracted rays.

FIG. 4 illustrates the results obtained by the numerical processing using computers based on the equations (8), (14), (19), and (21). In this processing, the optic incident angle $\theta_i$ was varied from 0 to 90° and the acoustic frequency was calculated. The processing was conducted for both optical combinations of o-in e-out and e-in o-out and for $\delta=0$ and $\delta=0.0005$. The wavelengths $\lambda$ of the diffracted rays were 0.6 μm and 2.5 μm.

Figure 5:
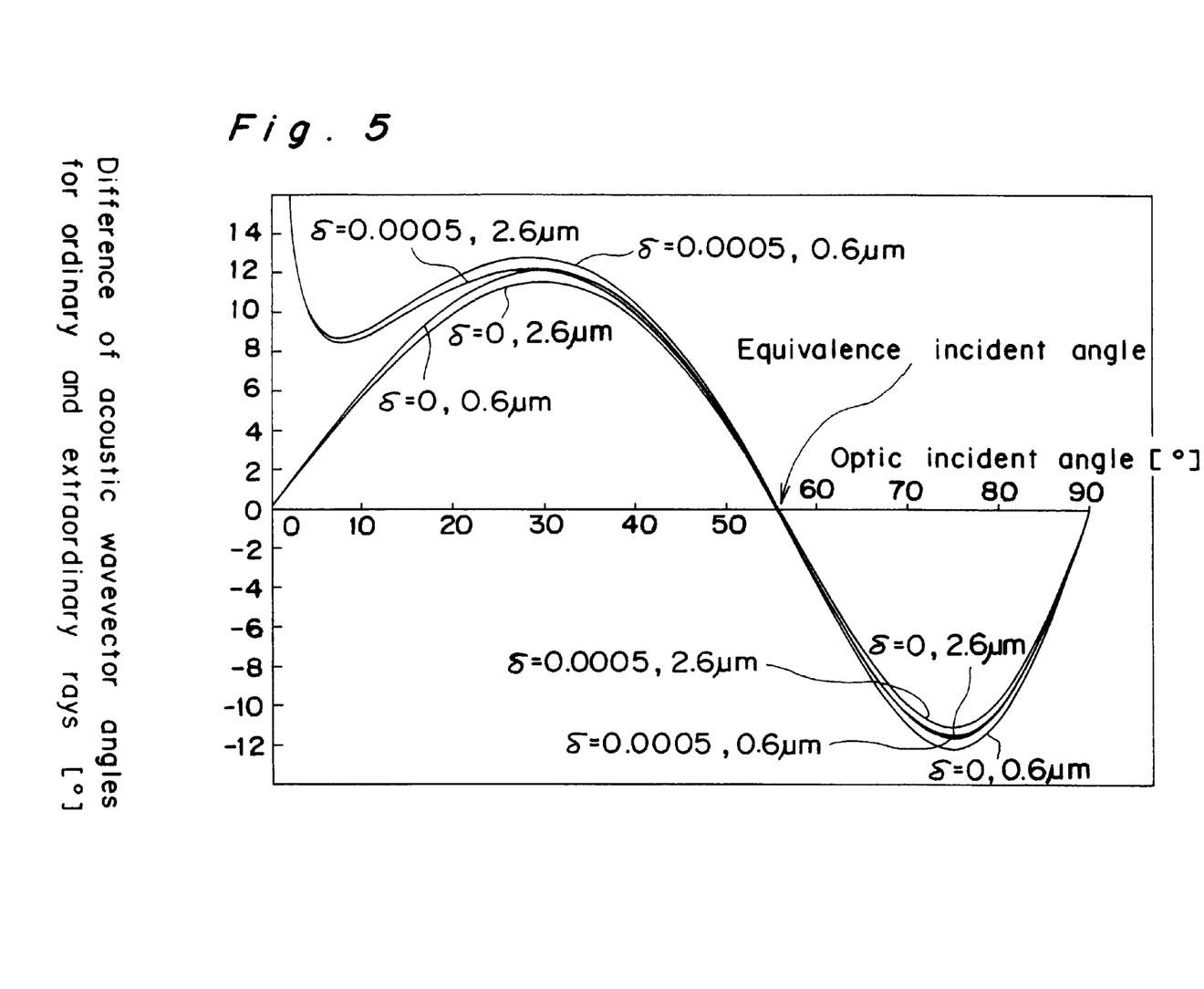
FIG. 5 is a graph that shows the relationship of the difference between the acoustic wavevector angle for the diffracted ordinary ray and the acoustic wavevector angle for the diffracted extraordinary ray to the optic incident angle.

FIG. 5 illustrates the results of calculating the optic incident angle such that $\tan \theta_{aeo} = \tan \theta_{aoe}$, using the equations (7) and (13). More specifically, FIG. 5 shows the differences between the acoustic wavevector angles for the diffracted ordinary rays and the acoustic wavevector angles for the diffracted extraordinary rays. The differences, called acoustic wavevector angle gaps hereafter, are shown with the varied optic incident angle. In the processing of obtaining these results, the acoustic wavevector angle gaps were calculated depending on the optic incident angle that was varied from 0° to 90°. The processing was conducted for $\delta=0$ and $\delta=0.0005$ and for the wavelengths $\lambda$ of the diffracted rays 0.6 μm and 2.5 μm.

Figure 6:
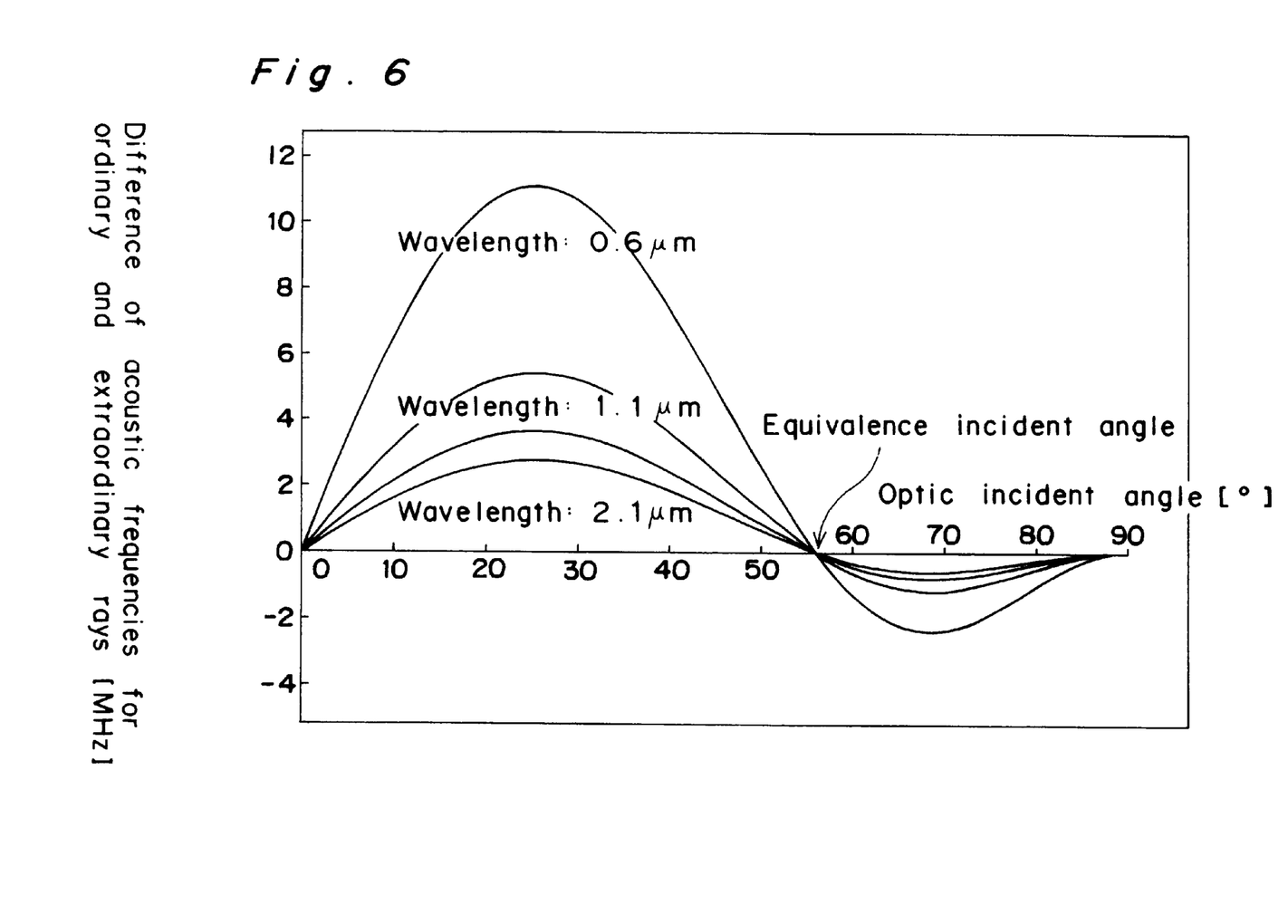
FIG. 6 is a graph that shows the relationship of the difference between the acoustic frequency for the diffracted ordinary ray and the acoustic frequency for the diffracted extraordinary ray to the optic incident angle.

FIG. 6 illustrates the results of calculating the optic incident angle such that $f_{aeo} = f_{aoe}$ using the equations (19) and (21). More specifically, FIG. 6 shows the differences between the acoustic frequencies for the diffracted ordinary rays and the acoustic frequencies for the diffracted extraordinary rays. The differences, called acoustic frequency gaps hereafter, are shown with the varied optic incident angle. In the processing of obtaining these results, the acoustic frequency gaps were calculated depending on the optic incident angle that was varied from 0° to 90°. The processing was conducted for $\delta \neq 0$ and for the wavelengths $\lambda$ of the diffracted rays 0.6 μm, 1.1 μm, and 2.1 μm. According to FIG. 6, the equivalence incident angle obtained from the acoustic frequencies weakly depends on the wavelength λ of the diffracted rays.

Figure 7:
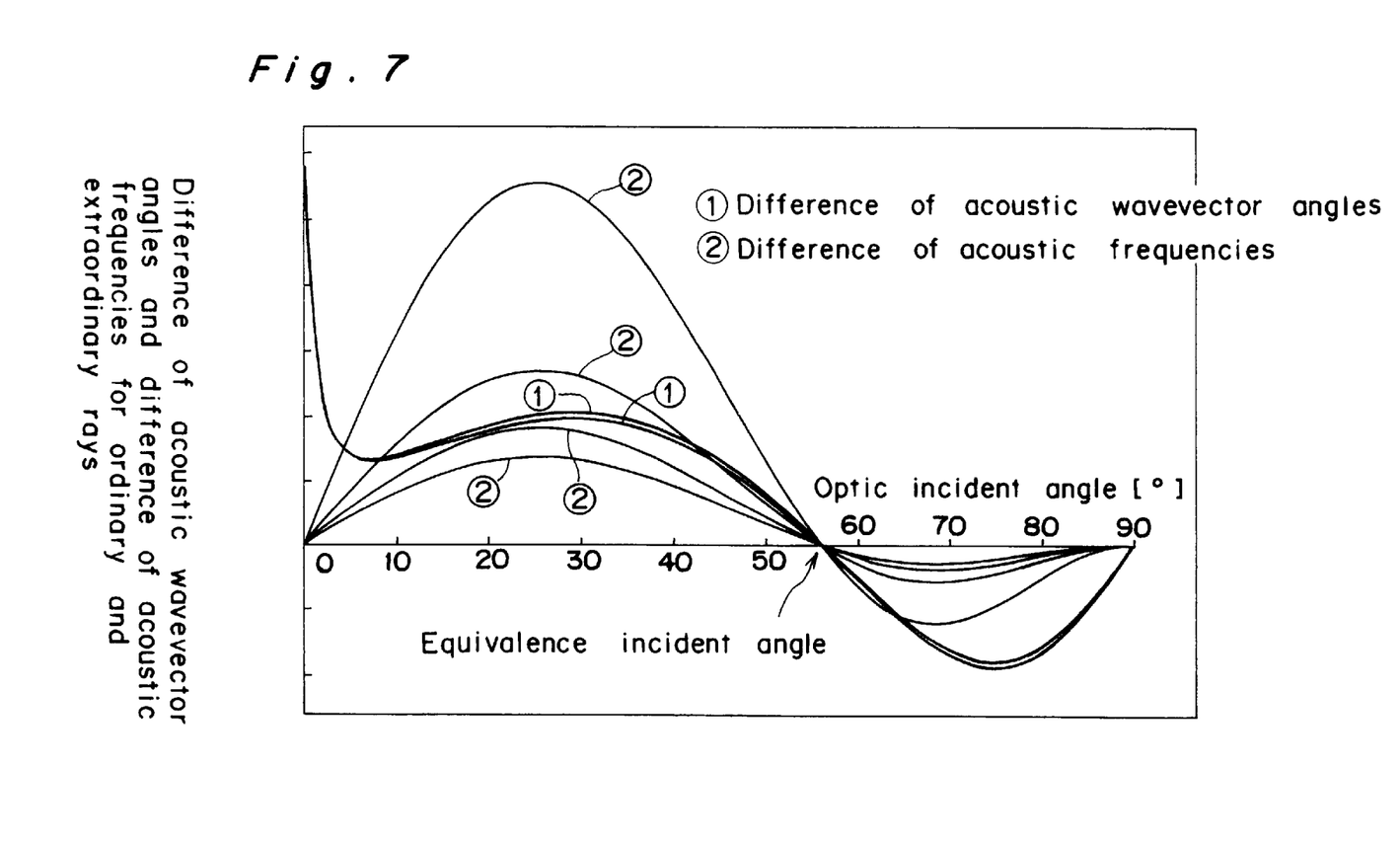
FIG. 7 is a graph obtained by superposing the graph of FIG. 5 and the graph of FIG. 6.

FIG. 7 is obtained from superposing the graph of FIG. 5 and that of FIG. 6. According to FIG. 7, it is observed that the equivalence incident angle obtained from acoustic wavevector angles and the equivalence incident angle obtained from acoustic frequencies approximately agree with each other.

(RELATIONSHIP BETWEEN ACOUSTIC WAVEVECTOR ANGLE AND OPTIC INCIDENT ANGLE)

According to FIG. 3, the perfect phase-matching condition cannot be maintained simultaneously for both the incident ordinary ray and the incident extraordinary ray at an arbitrary acoustic wavevector angle and an arbitrary optic incident angle except at the equivalence incident angle of about 56°. As mentioned above, it should be noted that the equivalence incident angle weakly depends on the wavelength λ of the diffracted rays.

(RELATIONSHIP BETWEEN ACOUSTIC FREQUENCY AND OPTIC INCIDENT ANGLE)

According to FIG. 4, the equivalence incident angle is approximately identical, about 56° regardless of the wavelength λ of the diffracted rays. The equivalence incident angle remains almost identical or weakly depends on the wavelength λ of the diffracted rays (ABOUT EQUIVALENCE INCIDENT ANGLE)

As described above, the equivalence incident angle $\theta_{i\theta}$ based on the condition for acoustic wavevector angles and the equivalence incident angle $\theta_{if}$ based on the condition for acoustic frequencies exist. According to FIG. 7, in which the graph of FIG. 5 and the graph of FIG. 6 are superposed, the above two equivalence incident angles agree with each other and remain almost fixed at the varied wavelength λ of the diffracted rays.

The next Table 1 shows the results of calculating the equivalence incident angles $\theta_{i\theta}$ and $\theta_{if}$ by varying the values of parameters.

TABLE 1

| | δ = 0 | | δ = 0.000455 | |
|---|---|---|---|---|
| | $\theta_{aeo} = \theta_{aoe}$ | $f_{aeo} = f_{aoe}$ | $\theta_{aeo} = \theta_{aoe}$ | $f_{aeo} = f_{aoe}$ |
| λ = 0.5 μm | 55.65877 | 55.70020 | 56.02182 | 55.97318 |
| 1.0 | 55.59902 | 55.63520 | 55.98784 | 55.92792 |
| 1.5 | 55.58978 | 55.62518 | 55.98291 | 55.92120 |
| 2.0 | 55.58666 | 55.62180 | 55.98126 | 55.91895 |
| 2.5 | 55.58527 | 55.620245 | 55.98053 | 55.91792 |

According to the computation results of Table 1, the following information can be obtained. First, if δ=0, then $\theta_{if}-\theta_{i\theta}$ is approximately between 0.035° and 0.041°. If δ=0.000455, then $\theta_{if}-\theta_{i\theta}$ is approximately between 0.048° and 0.0063°. Therefore, the equivalence incident angles are almost constant even if parameters change.

Secondly, the deviation of the equivalence incident angle or its dependency on the wavelength of the diffracted rays is as follows. If δ=0, then $\theta_{i\theta}(2.5)-\theta_{i\theta}(1.0)=-0.0073°$, $\theta_{i\theta}(1.0)-\theta_{i\theta}(0.5)=-0.034°$, $\theta_{if}(2.5)-\theta_{if}(1.0)=-0.01°$, and $\theta_{if}(1.0)-\theta_{if}(0.5)=-0.045°$.

Therefore, it is observed that the deviation of the equivalence incident angle or its dependency on the wavelength of the diffracted rays is not greater than 0.01° in the near infrared region and about 0.05° in the visible region. Considering the divergence of the incident light beam output from light source 6 and the characteristics of the acoustic wave output from transducer 2, the above deviation can be ignored. According to the equation (18) or (19), the acoustic wavevector angle $\theta_{aeo}=\theta_{aoe}$ is 108.244° for $\theta_i=55.982°$.

(CONCLUSION)

The following conclusions can be derived from the analytical results described above.

(a) If the source light beam (incident light) is unpolarized, then wavelength components of an identical wavelength in both the extraordinary ray (parallel polarization) and the ordinary ray (perpendicular polarization) are diffracted by an acoustic wave of a single frequency within the acoustic medium (AOTF cell), if the optic incident angle is the equivalence incident angle of about 55.9°. This characteristic has been found very useful in spectroscopic application in which the intensity of the source light (a spectral incident light) is low. In spectroscopy, the polarization state is usually not so important as signal intensity and wavelength resolution. Therefore, if the two diffracted rays (the output signals) generated from the incident extraordinary ray and the incident ordinary ray are superposed, then a strong output signal, which has a single wavelength but different polarization states is obtained, so that the accuracy of spectroscopy is enhanced.

(b) According to FIG. 3, the changes in the acoustic wavevector angle depending on the optic incident angle become mild near the equivalence incident angle of about 56°. Therefore, the perfect phase-matching condition is not entirely critical in determining the optic incident angle and the acoustic wavevector angle. This characteristic gives several advantages to the AOTF system. First, the angle for attaching the acoustic transducer does not need to be rigorous, so that the construction of the AOTF becomes easy. Also, the receiving angular aperture for the acoustic wave and the receiving angular aperture for the optic incident beam can be made large.

(c) According to FIG. 4, the perfect phase-matching curves for the acoustic frequency depending on the optic incident angle near the optic incident angle of 56° become flat. Therefore, the perfect phase-matching condition is not so critical at this range, so that the receiving angular aperture for the optic incident beam can be made large.

(d) According to FIG. 4, the vertical distance between the perfect phase-matching curves for different given wavelengths λ, (eg., λ=0.6 μm and 1.5 μm) of diffracted rays becomes maximum near the equivalence incident angle of about 56°. Therefore, on the one hand, higher acoustic frequency is required for shorter wavelength of the diffracted rays. On the other hand, high spectral resolution can be obtained for an electrically driven signal of a fixed bandwidth. It is no longer a significant problem to obtain a high drive frequency in the transducer. However, the purity of the electric signal can be low for a given spectral resolution, and spectral resolution can be enhanced for a given electric signal.

Although the present invention has been fully described in connection with the preferred embodiment thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A non-collinear type acousto-optic tunable filter having an acoustic medium formed of an optically transparent uniaxial crystal material, an acoustic wave application member that applies an acoustic wave of an arbitrary wavelength to said acoustic medium, and a light source that radiates a light beam that contains an incident ordinary ray and an incident extraordinary ray onto said acoustic medium in the direction intersecting with the path of said acoustic wave, such that wavelength components, corresponding to the acoustic frequency, of the incident ordinary ray and the incident extraordinary ray are diffracted within said acoustic medium and respectively separated into a monochromatic diffracted extraordinary ray and a monochromatic diffracted ordinary ray, said acousto-optic tunable filter including a filter optic axis set with respect to a surface normal of an incident face of the filter for which the wavelength of said diffracted ordinary ray and the wavelength of said diffracted extraordinary ray are approximately identical.

2. The acousto-optic tunable filter defined in claim 1 wherein said acousto-optic tunable filter has a photometric means that superposes said diffracted ordinary ray with said diffracted extraordinary ray to detect the intensity of the obtained superposed ray.

3. The acousto-optic tunable filter defined in claim 1, wherein said uniaxial crystal material is a tellurium dioxide crystal.

4. The acousto-optic tunable filter defined in claim 2, wherein said uniaxial crystal material is a tellurium dioxide crystal.

5. For a non-collinear type acousto-optic tunable filter having an acoustic wave applied to an acoustic medium formed of an optically transparent unaxial crystal material, a source light beam containing an incident ordinary ray and an incident extraordinary ray radiated onto said acoustic medium in a direction intersecting with the path of said acoustic wave, so that wavelength components, corresponding to the acoustic frequency, of said incident ordinary ray and said incident extraordinary ray are diffracted within said acoustic medium and respectively separated into a monochromatic diffracted extraordinary ray and a diffracted ordinary ray, a method of using the acousto-optic tunable filter for calculating an equivalence incident angle for which the wavelength of said diffracted ordinary ray and the wavelength of said diffracted extraordinary ray become approximately identical for a single acoustic frequency, said method comprising the steps of:

representing the wavevector surfaces of the ordinary rays and the extraordinary rays in a polar coordinate system in which the radius represents a wave number and the angle with the polar axis, which is the optic axis of said crystal material, represents the direction of an optic or acoustic wave;

formulating based on the conservation of momentum, a relationship between the wavevector of said incident extraordinary ray, the wavevector of said diffracted ordinary ray, and a first acoustic wavevector and decomposing the vector equation into the relationship between the magnitudes and the angles of the wavevectors;

introducing the relationship between the magnitude of said incident extraordinary wavevector an the refractive index and vacuum wavelength of said incident extraordinary ray, the relationship between the magnitude of said diffracted ordinary wavevector and the refractive index and vacuum wavelength of said diffracted ordinary ray, and the relationship between the magnitude of said first acoustic wavevector and the velocity and frequency of said first acoustic wavevector;

formulating and representing the refractive index surfaces that represent the relationships between the refractive indices and wavevector angles as ellipses in a polar coordinate system;

applying the parallel-tangent condition to the ellipses representing said refractive index surfaces, expressing the wavevector angle of said diffracted ordinary ray as a function of the optic incident angle and the wavelength of said diffracted ordinary ray, and expressing the refractive indices as functions of the optic incident angle and the wavelength of said diffracted ordinary ray;

expressing the angle of said first acoustic wavevector as a function of the optic incident angle and the wavelength of said diffracted ordinary ray, and expressing the acoustic frequency of said first acoustic wavevector as a function of the optic incident angle and the wavelength of said diffracted ordinary ray;

formulating, based on the conservation of momentum, a relationship between the wavevector of said incident ordinary ray, the wavevector of said diffracted extraordinary ray, and a second acoustic wavevector, and decomposing the vector equation into the relationship between the magnitudes and the angles of wavevectors;

introducing the relationship between the magnitude of said incident ordinary wavevector and the refractive index and vacuum wavelength of said incident ordinary ray, the relationship between the magnitude of said diffracted extraordinary wavevector and the refractive index and vacuum wavelength of said diffracted extraordinary ray, and the relationship between the magnitude of said second acoustic wavevector and the velocity and frequency of said second acoustic wavevector;

formulating and representing the refractive index surfaces that represent the relationships between the refractive indices and wavevector angles as ellipses in a polar coordinate system;

applying the parallel-tangent condition to the ellipses representing said refractive index surfaces, expressing the wavevector angle of said diffracted extraordinary ray as a function of the optic incident angle and the wavelength of said diffracted extraordinary ray, and expressing the refractive indices as functions of the optic incident angle and the wavelength of said diffracted extraordinary ray;

expressing the angle of said second acoustic wavevector as a function of the optic incident angle and the wavelength of said diffracted extraordinary ray, and expressing the acoustic frequency of said second acoustic wavevector as a function of the optic incident angle and the wavelength of said diffracted extraordinary ray;

obtaining as an equivalence incident angle an optic incident angle for which the angle of said first acoustic wavevector is equal to the angle of said second acoustic wavevector, or obtaining as an equivalence incident angle an optic incident angle for which the acoustic frequency of said first acoustic wavevector is equal to the acoustic frequency of said second acoustic wavevector.

6. The method as defined in claim 5 further comprising the step of setting the wavevector surface gap between the wavevector surface of extraordinary rays and the wavevector surface of ordinary rays on the optic axis of said crystal material at a nonzero value.

7. The method as defined in claim 6 further comprising the step of setting said wavevector surface gap at approximately 0.0005.

8. The method as defined in claim 5 further comprising the step of setting the wavevector surface gap between the wavevector surface of extraordinary rays and the wavevector surface of ordinary rays on the optic axis of said crystal material at 0.

9. For a non-collinear type acousto-optic tunable filter having an acoustic wave applied to an acoustic medium formed of an optically transparent unaxial crystal material, a source light beam containing an incident ordinary ray and an incident extraordinary ray radiated onto said acoustic medium in a direction intersecting with the path of said acoustic wave, so that wavelength components, corresponding to the acoustic frequency, of said incident ordinary ray and said incident extraordinary ray are diffracted within said acoustic medium and respectively separated into a monochromatic diffracted extraordinary ray and a diffracted ordinary ray, a method of using the acousto-optic tunable filter for calculating an equivalence incident angle for which the wavelength of said diffracted ordinary ray and the wavelength of said diffracted extraordinary ray become approximately identical for a single acoustic frequency, said method comprising the steps of:

representing the wavevector surfaces of the ordinary rays and the extraordinary rays in a polar coordinate system in which the radius represents a wave number and the angle with the polar axis, which is the optic axis of said crystal material, represents the direction of an optic or acoustic wave;

formulating, based on the conservation of momentum, a relationship between the wavevector $K_{ie}$ of said incident extraordinary ray, the wavevector $K_{do}$ of said diffracted ordinary ray, and a first acoustic wavevector $K_{aeo}$, and decomposing the vector equation into the relationship between the magnitudes and the angles of the wavevectors as first equations $K_{aeo} \cdot \sin \theta_{aeo} = K_{ie} \cdot \sin \theta_i - K_{do} \cdot \sin \theta_{do}$, $K_{aeo} \cdot \cos \theta_{aeo} = K_{ie} \cdot \cos \theta_i - K_{do} \cdot \cos \theta_{do}$;

introducing the relationship between the magnitude of said incident extraordinary wavevector an the refractive index and vacuum wavelength of said incident extraordinary ray, the relationship between the magnitude of said diffracted ordinary wavevector and the refractive index and vacuum wavelength of said diffracted ordinary ray, and the relationship between the magnitude of said first acoustic wavevector and the velocity and frequency of said first acoustic wavevector as a second equation $K_{ie} = 2\pi n_{ie}/\lambda_o, K_{do} = 2\pi n_{do}/\lambda_o, K_{aeo} = 2\pi f_{aeo}/V_a$;

formulating and representing the refractive index surfaces that represent the relationships between the refractive indices and wavevector angles as ellipses in a polar coordinate system;

applying the parallel-tangent condition to the ellipses represent ing s aid refractive index surfaces, expressing the wavevector angle of said diffracted ordinary ray as a function of the optic incident angle and the wavelength of said diffracted ordinary ray as a third equation $\tan \theta_{do} = \tan \theta_{do}(\theta_i, \lambda) = [n_o(\lambda)/n_e(\lambda)]^2 \cdot \tan \theta_i$, and expressing the refractive indices as functions of the optic incident angle and the wavelength of said diffracted ordinary ray are obtained as fourth equations $n_{ie} = n_{ie}(\theta_i, \lambda) = (\cos^2 \theta_i/n_o^2(\lambda) + \sin^2 \theta_i/n_e^2(\lambda))^{-1/2}$, $n_{do} = n_o(\lambda)$;

based on the first to fourth equations, expressing the angle of said first acoustic wavevector as a function of the optic incident angle and the wavelength of said diffracted ordinary ray as a fifth equation $$= \frac{n_{ie}(\theta_i, \lambda) \cdot \sin\theta_i - n_o(\lambda) \cdot \sin[\theta_{do}(\theta_i, \lambda)]}{n_{ie}(\theta_i, \lambda) \cdot \cos\theta_i - n_o(\lambda) \cdot \cos[\theta_{do}(\theta_i, \lambda)]},$$

and expressing the acoustic frequency of said first acoustic wavevector as a function of the optic incident angle and the wavelength of said diffracted ordinary ray as a sixth equation $f_{aeo} = f_{aeo}(\theta_i, \lambda) = (V_a/\lambda_o)[n_{ie}^2(\theta_i, \lambda) + n_o^2(\lambda) - 2n_{ie}(\theta_i, \lambda) \cdot n_o(\lambda) \cdot \cos \theta_{do}(\theta_i, \lambda) - \theta_i)]^{1/2}$;

formulating, based on the conservation of momentum, a relationship between the wavevector of said incident ordinary ray, the wavevector of said diffracted extraordinary ray, and a second acoustic wavevector, and decomposing the vector equation into the relationship between the magnitudes and the angles of wavevectors as a seventh equation $$\tan\theta_{aeo} = \frac{a^3 + \sqrt{(x^2 + a^4)(x^2 + a^2)}}{ax};$$

introducing the relationship between the magnitude of said incident ordinary wavevector and the refractive index and vacuum wavelength of said incident ordinary ray, the relationship between the magnitude of said diffracted extraordinary wavevector and the refractive index and vacuum wavelength of said diffracted extraordinary ray, and the relationship between the magnitude of said second acoustic wavevector and the velocity and frequency of said second acoustic wavevector as an eighth equation $$f_{aeo} = \frac{V_a n_o(\lambda)}{\lambda_o} \sqrt{1 + \frac{a^2(1+x^2)}{a^2+x^2} - 2a\sqrt{\frac{a^2+x^2}{a^4+x^2}}};$$

formulating and representing the refractive index surfaces that represent the relationships between the refractive indices and wavevector angles as ellipses in a polar coordinate system;

applying the parallel-tangent condition to the ellipses representing said refractive index surfaces, expressing the wavevector angle of said diffracted extraordinary ray as a function of the optic incident angle and the wavelength of said diffracted extraordinary ray as a ninth equation $K_{aoe} \cdot \sin \theta_{aoe} = K_{de} \cdot \sin \theta_{de} - K_{io} \cdot \sin \theta_i$, $K_{aoe} \cdot \cos \theta_{aoe} = K_{de} \cdot \cos \theta_{de} - K_{io} \cdot \cos \theta_i$, and expressing the refractive indices as functions of the optic incident angle and the wavelength of said diffracted extraordinary ray as tenth equations $$K_{de}=2\pi n_{de}/\lambda_o, K_{io}=2\pi n_{io}/\lambda_o, K_{aeo}=2\pi f_{aeo}V_a;$$

based on the seventh to tenth equations expressing the angle of said second acoustic wavevector as a function of the optic incident angle and the wavelength of said diffracted extraordinary ray as an eleventh equation $$\tan\theta_{de}=\tan\theta_{de}(\theta_i,\lambda)=[n_e(\lambda)/n_o(\lambda)]^2\cdot\tan\theta_i,$$

and expressing the acoustic frequency of said second acoustic wavevector as a function of the optic incident angle and the wavelength of said diffracted extraordinary ray as a twelfth equation $$n_{io}=n_o(\lambda),$$

$$n_{de}=n_{de}(\theta_i,\lambda)=[\cos^2\theta_{de}(\theta_i,\lambda)/n_o^2(\lambda)+\sin^2\theta_{de}(\theta_i,\lambda)/n_e^2(\lambda)]^{-\frac{1}{2}};$$

obtaining as an equivalence incident angle an optic incident angle for which the angle of said first acoustic wavevector obtained by said fifth equation is equal to the angle of said second acoustic wavevector obtained by the eleventh equation, or obtaining as an equivalence incident angle an optic incident angle for which the acoustic frequency of said first acoustic wavevector obtained by said sixth equation is equal to the acoustic frequency of said second acoustic wavevector obtained by said twelfth equation.

10. The method as defined in claim 5 further comprising the step of setting the wavevector surface gap between the wavevector surface of extraordinary rays and the wavevector surface of ordinary rays on the optic axis of said crystal material at a nonzero value.

11. The method as defined in claim 6 further comprising the step of setting said wavevector surface gap at approximately 0.0005.

12. The method as defined in claim 5 further comprising the step of setting the wavevector surface gap between the wavevector surface of extraordinary rays and the wavevector surface of ordinary rays on the optic axis of said crystal material at 0.

* * * * *